INVENTOR
JOHN H. SCHMID

March 17, 1964 J. H. SCHMID 3,124,809
FLUSHING ARRANGEMENT, BACKFLOW PREVENTER, AND
WATER CLOSET COMBINATION
Filed Feb. 20, 1961 5 Sheets-Sheet 2

INVENTOR
JOHN H. SCHMID
BY
Charles L. Lovercheck
attorney

March 17, 1964 J. H. SCHMID 3,124,809
FLUSHING ARRANGEMENT, BACKFLOW PREVENTER, AND
WATER CLOSET COMBINATION
Filed Feb. 20, 1961 5 Sheets-Sheet 3

INVENTOR
JOHN H. SCHMID
BY
Charles L. Lovercheck
attorney

March 17, 1964

J. H. SCHMID 3,124,809

FLUSHING ARRANGEMENT, BACKFLOW PREVENTER, AND
WATER CLOSET COMBINATION

Filed Feb. 20, 1961

INVENTOR
JOHN H. SCHMID
BY

Charles L. Loverched
attorney

March 17, 1964 J. H. SCHMID 3,124,809
FLUSHING ARRANGEMENT, BACKFLOW PREVENTER, AND
WATER CLOSET COMBINATION
Filed Feb. 20, 1961 5 Sheets-Sheet 5
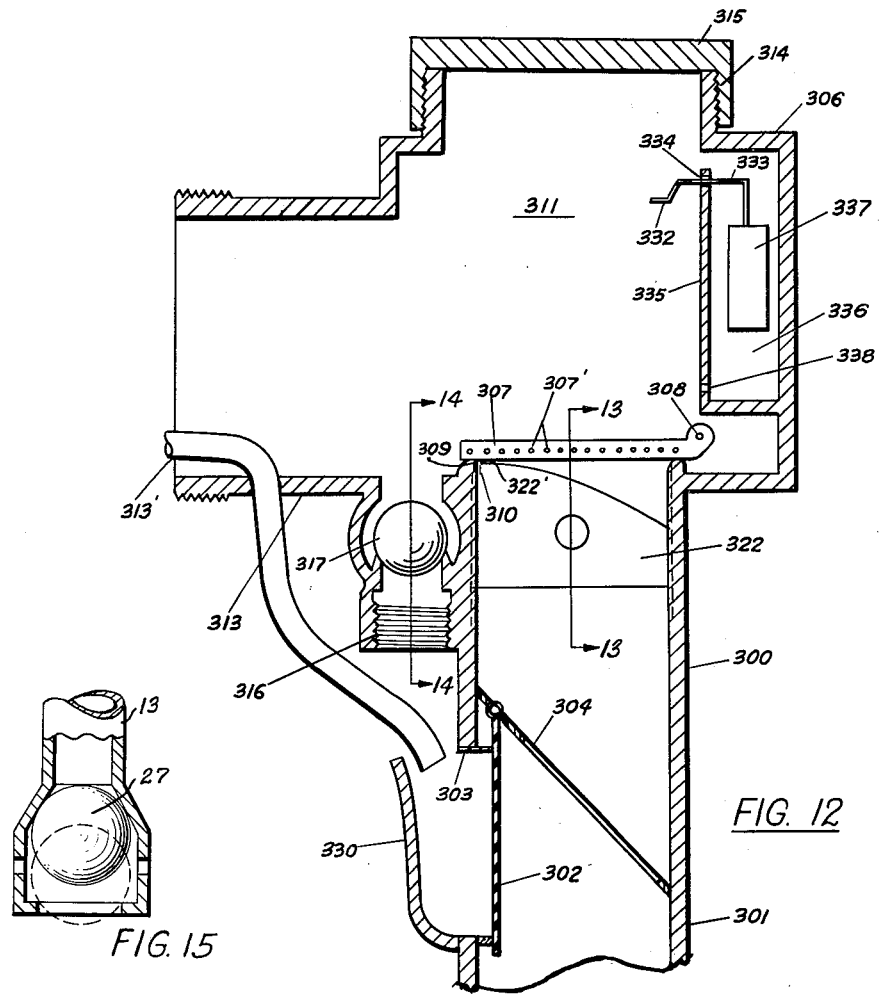
FIG. 12
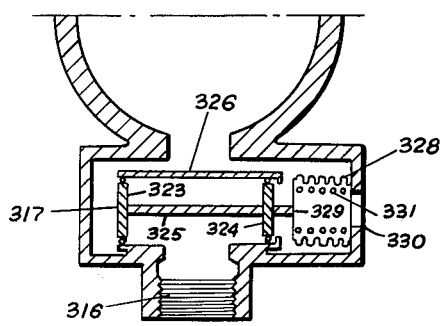
FIG. 15
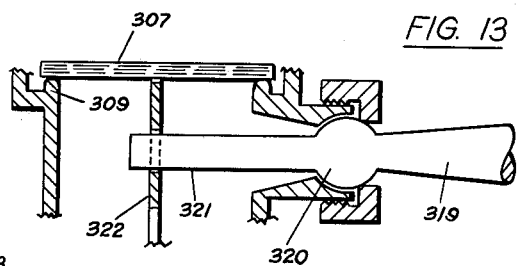
FIG. 14
FIG. 13
INVENTOR
JOHN H. SCHMID
BY
Charles L. Lovershed
attorney

United States Patent Office 3,124,809
Patented Mar. 17, 1964

3,124,809
FLUSHING ARRANGEMENT, BACKFLOW PREVENTER, AND WATER CLOSET COMBINATION
John H. Schmid, 1315 G. Daniel Baldwin Bldg., Erie, Pa.
Filed Feb. 20, 1961, Ser. No. 113,049
11 Claims. (Cl. 4—26)

This invention relates to water closets and, more particularly, to flushing mechanisms for and in combination with water closets of both the floor and wall type.

Various problems exist in connection with the flushing mechanism used with water closets, including those supported on walls. These problems are familiar to those skilled in the art. The present invention proposes to overcome various disadvantages and defects in prior flushing arrangements for such closets.

More particularly, it is an object of the invention to provide a wall closet flushing means which operates on any positive pressure within the limits of an extremely high pressure and low pressure limited only by the strength of the system.

Another object of the invention is to provide a water closet whose flushing operation is independent of the supply line size. Thus, the vigor and effectiveness of flush is always the same in the improved flushing mechanism regardless of the line pressure of the supply line or of the size of the supply line itself.

Still another object of the invention is to provide a water closet flushing arrangement wherein the amount of water used for each flush is independent of the supply line size or pressure.

Yet another object of this invention is to provide a water closet flushing arrangement wherein the full volume of the tank will be utilized for flushing regardless of the supply line pressure, thereby making it possible to use a minimum size of tank.

A further object of the invention is to provide a water closet flushing means wherein no pressure reducing valves are required for high pressure line supplies.

Still a further object of the invention is to provide a water closet flushing means wherein the size of the tank may be constant regardless of the pressures of line to which the tank is to be connected.

Yet a further object of the invention is to provide a water closet wherein the closet and flushing means are available and accessible from the side of the wall adjacent the water closet.

It is a further object of the invention to provide a small compact closet suitable for home use which will extend only a minimum distance from a wall, thus saving bathroom space.

Still a further object of the invention is to provide a water closet flushing means having full and positive protection against back siphonage or cross connection.

Still yet a further object of the invention is to provide a water closet and flushing means utilizing a tank having a diameter small enough to fit within 2" x 6" partitions even when lagged to prevent sweating of the tank.

It is yet another object of the invention to provide a water closet means wherein the tank fills after each use and it is not necessary to wait for the tank to fill while in use.

Yet another object of the invention is to provide an improved, simple, rugged support adjustable to accommodate various wall finish variations.

Still yet another object of the invention is to provide a water closet flushing means which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

FIGS. 12, 13, and 14 are views of another embodiment of the invention; and

Figure 1:
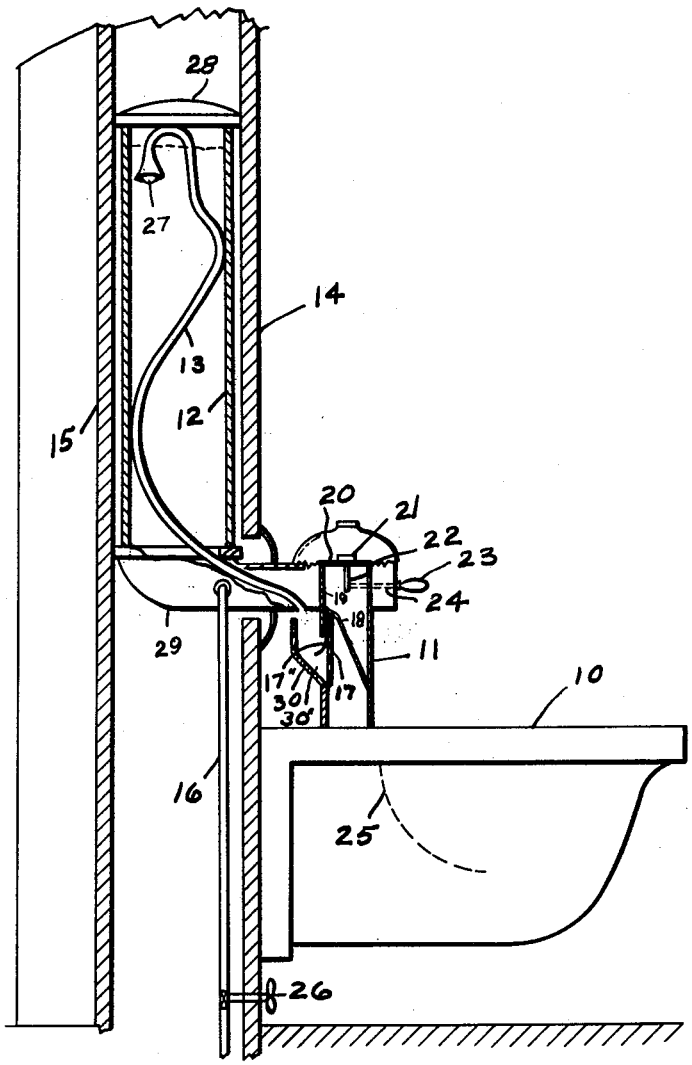
FIG. 1 is a vertical cross sectional view of an installation of a closet and flushing tank according to the invention.
Figure 4:
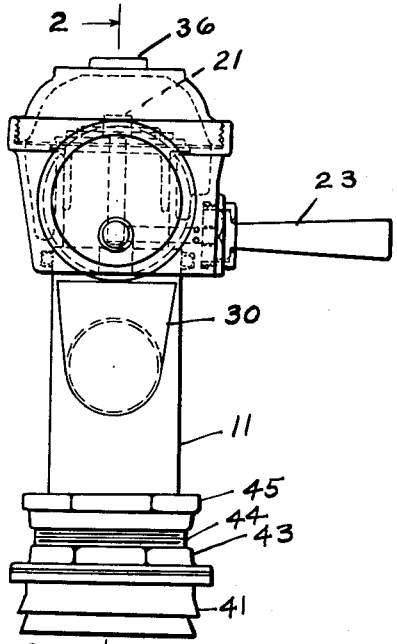
FIG. 4 is a rear view of the valve.

FIG. 15 is a vertical cross sectional view of the valve shown in FIG. 1.

Now with more particular reference to the drawings, a combination according to the invention is shown wherein a closet bowl 10 is shown carried on a suitable support adjacent to and in front of a surface 14 by means of a suitable support.

A closed flush tank 12 is connected to the closet through a flush pipe having a body 11 and valve associated therewith. A flexible vent and safety overflow pipe 13 extends through an opening in a member 29 and connects the portion in front of a cup 30 with the space at the top of the flush tank 12. The cylindrical tank 12 is supported between the wall surfaces 14 and 15 and the tank 12 is supplied water by a supply pipe 16 which may be connected to a city main water supply by means of a shut off valve 26.

Figure 2:
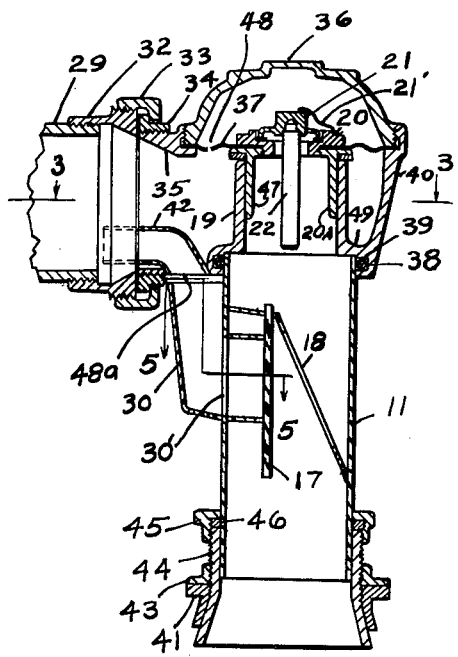
FIG. 2 is a cross sectional view taken on line 2—2 of FIG. 4.
Figure 3:
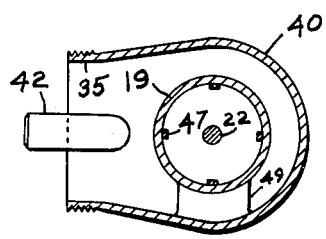
FIG. 3 is a cross sectional view taken on line 3—3 of FIG. 2.
Figure 5:
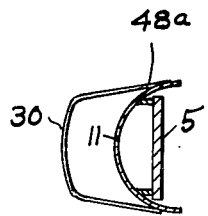
FIG. 5 is a cross sectional view taken on line 5—5 of FIG. 2.

The flow of water through the overflow pipe 13 will normally be checked by a floating check valve 27. A flap valve 17 is connected by a flexible neck which hingedly connects it to a seat 18. The valve 17 will normally be in the position shown in FIG. 2 where it closes the lateral opening in the body 11 in the cup 30. Should the check valve 27 fail to close when water from the pipe 16 fills the tank 12, the water will flow through the pipe 13 into the cup 30. The water will push the flap valve 17 to swing into open position, allowing the water to flow into the closet where it may overflow out of the trap and cause no damage.

Under conditions when a vacuum exists in the supply line such as may occur when the pressure in the city main drops, air will tend to enter the tubular body 11 at a port 30' and swing the flap valve 17 against seat 18, thereby preventing passage of air or water from the bowl to the supply line. This complies with the requirements for a back flow preventer since there is full access of atmospheric air coincidental with the closing of the flap valve 17. A flat spring 17'' could be included to urge the flap valve 17 into contact with seat 18 in which case, when the closet is flushed, flap valve 17 will be forced against spring 17'' and close port 30'.

The flush valve is made up of the tubular body 11 and an upper flush valve body 19. The upper flush valve body 19 may be in the form of a casting or molding of plastic or the like or it could be fabricated. The upper body 19 has an internal groove 39 at its lower end formed in a counterbore which receives an O-ring 38. The O-ring 38 forms a seal with the upper end of the tubular body 11. The lower end of the tubular body 11 is received in a flared member 44 and is sealed thereto by means of a packing 46 which is held in sealed engagement with the tubular body 11 by means of a packing nut 45. The flared member 44 may be inserted in an opening in the top of a water closet with a packing 41 therebetween and a nut 43 tightened to cause the packing 41 to form a liquid tight seal with the closet.

The upper end of the valve body has a threaded counterbore therein which receives the outside male threads on a cover 36. The cover 36 has a lower concave side which defines a chamber therein and the threads clamp the outer periphery of a diaphragm 37 into sealing engagement therewith. An orifice 48 is formed in the diaphragm to allow water to flow from the upstream side of the diaphragm into the chamber above the diaphragm to thereby impress a force on the upper side of a backing member 20 as well as the diaphragm 37.

The backing member 20 is clamped in an opening in the center of the diaphragm 37 and it has an extension threadably received in a guide member 20a. The diaphragm is clamped against the upper side of the guide member 20a. A valve stem 22 extends through the opening in the backing member 20 and is attached to a valve member 21. The valve member 21 is attached to the backing member 20 by a flat cantilever spring 21' to urge the valve 21 toward its seat when it has been unseated. The valve stem 22 rests against an actuating rod 24 which abuts against a handle 23 in a manner familiar to those skilled in the art.

When the operator flushes the water closet, he actuates the handle 23 which tilts the valve member 21 and allows the water in the chamber between the diaphragm and the cover 36 to flow into the cylindrical body 11. This reduces the pressure above the diaphragm 37 and the pressure from the tank below the diaphragm at the upstream side thereof lifts the guide member 20a and allows the water from the tank to flow through the spaces between guide posts 47 which are integrally fixed to the guide member. This flush water will flow down over the flap valve 17 and through the flared member 44 into the closet.

The inner cylindrical valve body 19 extends up into an outer valve body 40 and has an inner cylindrical surface which forms a guiding surface for the guide posts 47. An opening is formed at 48a which is sealingly connected to an output end connection 42 of the pipe 13 so that if the valve 27 fails, water will not flood the premises but will flow through the overflow pipe 13 into the cup 30 and force the valve 17 open. Therefore, the water may harmlessly flow into the water closet.

The valve has a hollow boss 35 which is integrally attached to the valve body 40 and is threadably connected to a shouldered nut 34 which has an outwardly extending rim or shoulder which engages a union nut 33 and is threadably connected to a connector 32. The connector 32 is in turn threadably connected to the member 29. The member 29 has an upwardly extending bell portion 50 which is internally threaded and receives the lower end of the pipe forming the tank 12. This pipe could be a suitable steel pipe of a nominal four inch size or the like or it could be made of plastic or other suitable material.

A tank top 28 is threadably attached to the upper end of the pipe forming the tank 12 and this top forms a liquid type closure for the upper end thereof. The supply pipe 16 is suitably connected to the bottom of the tank.

The bottom member may be made in the form of an iron casting or it could be of any other suitable material. It preferably has threaded openings in bosses 53 which receive studs 51 which are adapted to clamp the bottom member to bars 52. These bars may be attached to a suitable closet support which may support the fitting which will in turn connect the closet to a suitable waste pipe.

The check valve 27 may be a hollow ball supported in the flared end of the tube and suitable retainers may be provided to prevent it from falling out of the end of the tube when the tank is emptied.

Figure 7:
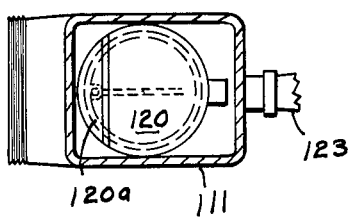
FIG. 7 is a top sectional view taken on line 7—7 of FIG. 6.
Figure 6:
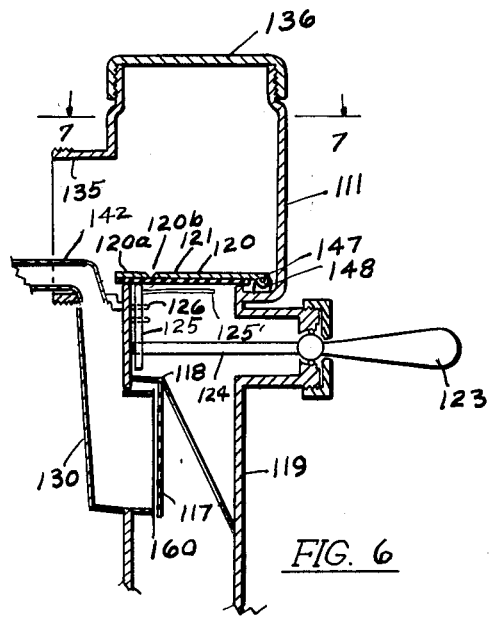
FIG. 6 is a vertical cross sectional view of a valve according to another embodiment of the invention similar to FIG. 2.
Figure 9:
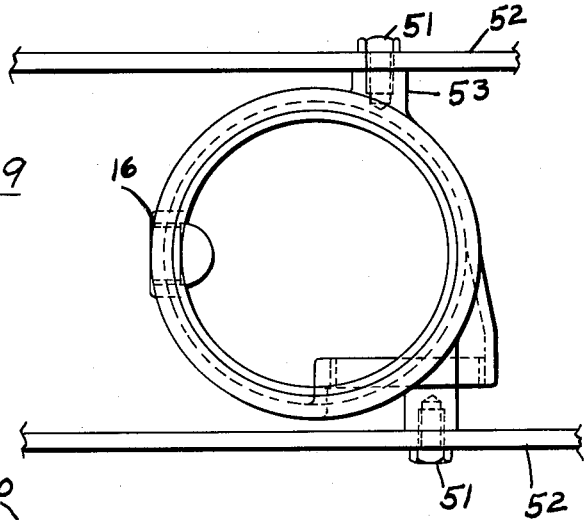
FIG. 9 is a top view of the tank bottom shown in FIG. 1.
Figure 10:
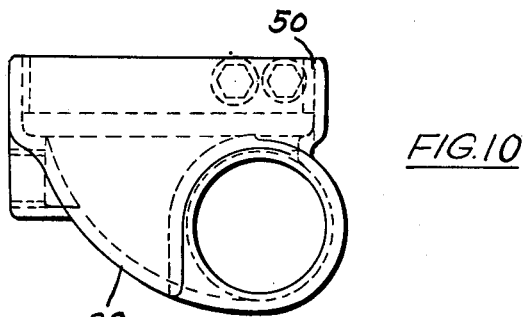
FIG. 10 is a front view of the tank bottom shown in FIG. 1.
Figure 11:
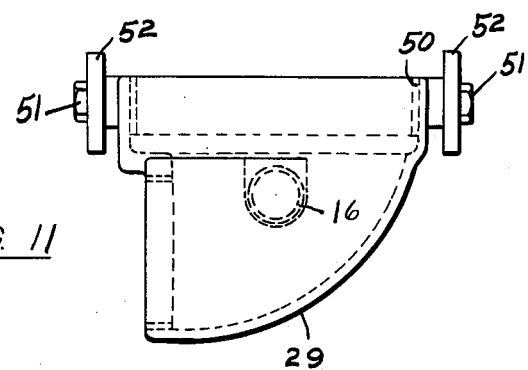
FIG. 11 is a side view of the member shown in FIG. 10.

In the embodiment of the invention shown in FIGS. 6 and 7, a handle 123 is connected through a rod 124 which slips loosely into a hole in an actuating member 125. A flush valve member 121 has a rigid backing member 120 which is separated from the front end thereof indicated at 120a by a groove 120b formed therein. The backing member 120 is hingedly connected to a valve body 111 by means of a pin 147 which connects it to ears 148. A vent pipe 142 extends through an entrance 135. The valve body 111 has a cover 136 threadably attached thereto to form a closure and to provide access to the backing member 120.

The actuating member 125 is slidably received in holes in ears 126 which are integrally connected to the inside of the valve body 111. The valve body 111 has an opening 160 therein in a lower tubular portion 119 and the opening 160 communicates with a cup 130. The opening 160 is closed by a flap valve 117 which is hingedly connected to the valve body at 118. The housing of the cup 130 provides a channel for fluid to flow from the vent pipe 142 through the opening 160, past the valve 117, and discharge into the water closet sump. Therefore, should the check valve corresponding to the valve 27 in FIG. 1 leak when the tank is full, water would flow through the vent pipe 142 through the flap valve 117 into the water closet.

The operator can easily open the flush valve by pressing on the handle 123. Little pressure is required since the front part 120a of the valve only is lifted initially manually. This releases the pressure above the backing member 120 so that it will be lifted further by the end of an arm 125' until full opening will result from the velocity of the water. The arm 125' is fixed to the actuating member 125. When the tank has emptied, gravity will close the valve 121.

Figure 8:
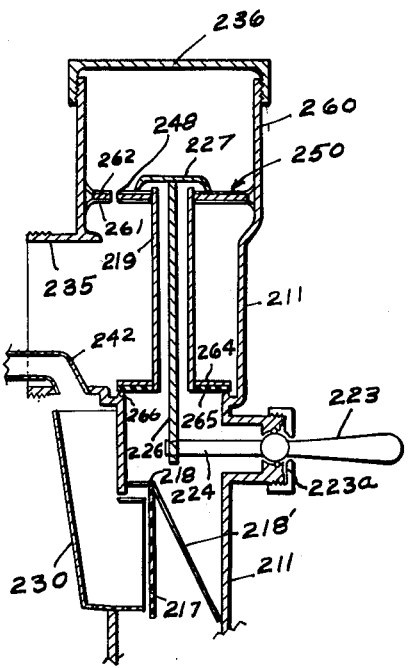
FIG. 8 is a view of still another embodiment of the invention.

In the embodiment of the invention shown in FIG. 8, a valve body 211 is shown wherein a handle 223 is pivotally connected inside the gland by a nut 223a and sealed against leakage therein. The handle 223 is connected through an actuator 224 which is received loosely in a hole in an actuator 226 which is in turn attached to a valve pilot 227. The valve pilot 227 forms a closure for the opening through a tube 219 which communicates from the chamber below a cover 236 to the downstream side of a valve washer 265 inside the body 211. The lower part of the body 211 has a lateral opening therein communicating between a cup 230 and the inside of the body 211.

A flap valve 217 is hingedly connected at 218 to the valve body 211 and forms a closure for the outlet of the cup 230 in the normal position. It will swing to the closed position to prevent flow during normal operation. An overflow line 242 operates as in the other embodiments and an inlet 235 is connected to a member such as the member 29 in FIG. 1. A seat 218' has an opening which the flap valve 217 will close under vacuum conditions in the supply line.

The piston 250 of the actuating member 226 slides up and down in an inside cylindrical surface 260 of the valve body and has rubber disks 261 and 262 on the upstream and downstream sides thereof which form sealing engagement with the inside of the valve body as it slides up and down. The tube 219 connects to a disk 264. The rubber washer 265 is attached to the underside of the disk 264 and this forms sealing engagement with the entrance to the outlet at 266. An orifice 248 is provided in the piston 250 to allow fluid to flow into the chamber under the cover 236. When water fills this chamber, it will force the piston 250 down and thus move the washer 265 to the closed position.

When it is desired to flush the water closet, the operator will actuate the handle 223 which will, through the actuator 224, open the pilot 227 and allow the pressure in the chamber under the cover 236 to be reduced. Therefore, the pressure of water from the tank imposed under the piston will force it upward and lift the washer 265 out of engagement with the seat around the opening 266. Water will flow out of the tank through the body 211 and flush the closet. Then when all of the water has flowed out of the tank, no pressure will be imposed below the piston and the valve washer 265 and pilot 227 will drop to closed position. This will stop the flow through the valve and water will again flow through the orifice 248 to fill the chamber below the cover 236 and to fill the tank. At this point, the closet will be ready to be flushed again; however, if the check valve should fail, water will flow through the line 242 and through the flap valve 217 and will cause no damage as in the other embodiments.

In the embodiment of the invention shown in FIGS. 12, 13, and 14, another embodiment of a flush valve is shown. The flush valve has a body 300 having a hollow, generally cylindrical lower portion 301 with a back flow preventer flap 302 closing an opening 303 on the side of the body when in the rest position and adapted to be swung upward to close an opening 304 in the body 300 to prevent water from flowing back up through the upper part of the valve into the tank if pressure below atmosphere develops in the supply line.

An upper part 306 of the body is isolated from the lower part by a flexible flap type valve 307 which is hinged to the body 300 at 308 and, when closed, rests on a seat 309 around a flush opening 310. A cavity 311 in the top of the flush valve is connected to the flush tank by a threaded connection 313 and the top of the valve is covered by a cover 315 connected to the valve by a threaded connection 314.

The tank is connected to the supply line by a pressure controller 317. The pressure controller 317 allows water to enter the tank until the pressure therein builds up to a predetermined value. The controller 317 then stops the flow of waetr.

The flap valve 307 may be opened by a control handle 319 which is swingably and sealingly connected to the valve body at 320 and has a control rod 321. The control rod 321 engages the downwardly extending bar 322 which abuts against the valve 307 at its upper end so that when the handle 319 is pushed downwardly, it will pivot about the part 320 and open the valve 307.

The flap valve 307 is flexible in one direction only since rods 307' are parallel to the hinge pin and are embedded in the flap valve 307.

The bar 322 is so shaped that it will lift only the front portion of the flap valve 307 initially so that the pressure in the tank will be relieved, making it easy for the balance of the movement of valve 307 so that the velocity of the water will force it to a full open position. The bar 322 has a protrusion 322' which engages the flexible flap valve 307 upon initial movement of the handle 319. The upper surface of the bar 322 is curved so that it maintains engagement of the flap valve 307 throughout its movement.

The controller 317 is made up of pistons 323 and 324 supported in spaced relation on a shaft 325. Each piston has a peripheral groove which receives an O-shaped sealing washer as a piston ring. The pistons slide inside a cylinder 326 to open and close a supply line connection 316. The shaft 325 is connected to a bellows 328 at 329 and an opening 330 which communicates with the inside of the bellows 328 which communicates with atmosphere. A spring 331 has one end disposed against the inside of the controller around the opening 330 and the other end engages the end of the bellows adjacent the shaft 325, urging the piston to move to the left to open the inlet.

This pressure is counterbalanced by the force on the outside of the bellows 328 which opposes the force of the spring. Therefore, when the flush tank is full and the pressure head thereof is imposed on the outside end of the bellows 328, the bellows will be held in the position shown. Then when the water closet is flushed, the pressure head on the outside end of the bellows 328 will be reduced and the spring 331 will force the bellows to the left, opening the supply line and allowing water to flow into the tank to fill it. This water will continue to flow until the pressure head again overbalances the force of the spring 331 to move the bellows to the position shown, thereby closing it.

A latch 332 is attached to a shaft 333 and the shaft 333 is swingably supported at 334 on a valve web 335. A space 336 behind the web 335 contains a float 337 which is fixed to the shaft 333. The space 336 is drained by a bleed port 338 so that when the flush tank is drained, the float 337 will drop, lifting the latch 332 to unlatch it from the flap valve 307. When the flap valve 307 is pushed to open position, it will spring up and the top thereof will be caught by the latch 332, thereby holding it open. Then as the water drains out of the space 336, the float 337 will drop, unlatching the latch 332 and allowing the flap valve 307 to fall to the closed position shown. The time delay in closure of the flap valve 307 so gained allows the closet bowl to refill with water from the supply pipe connecting at 316 and, at the same time, insures that the tank will drain completely and fill with air from the outlet, which is not filled with water from the supply, so that the air trapped in the tank is constant.

Obviously, the embodiment shown in FIGS. 12, 13, and 14 could have added to it a pipe 13, valve 27, and cup 30 as shown in FIG. 1 to serve the same function as outlined previously herein. This may be done by adding a cup 330 and a vent line 313' shown in FIG. 12.

The foregoing specification sets forth the invention in its preferred practical forms but it will be seen that the structure shown is capable of modification within a range of equivalents without departing from the invention which is to be understood is broadly novel as is commensurate with the appended claims. For example, the flush valve could be mounted in the wall with a concealed supply to the closet.

The embodiments of the invention in which an exclusive property or privilege is claimed are defined as follows:

1. A flushing tank for a water closet comprising
a pressure tight tank adapted to be supported adjacent a water closet,
connection means comprising a tubular body connecting said tank to the inside of said water closet, means to connect a water supply line to said tank, valve means connecting said tank to said water closet through said tubular body, vent means comprising a tubular member in said tank supported from the bottom of said tank to a position adjacent the top of said tank connecting the interior of said tank to atmosphere through said connection means, allowing air to enter said tank from said connection means when said tank is flushed and allowing said air to escape from said tank into said connection means when said tank is being filled, and a backflow prevention means in said tubular body between said valve means and said closet positively closing the flow passage through said connection means when the pressure in said tank and on the side of said backflow prevention means adjacent said tank falls below a predetermined value.

2. The flushing tank recited in claim 1 wherein said valve means has a cup thereon having a top communicating with atmosphere, said vent means communicating with said cup whereby overflow from said tank is discharged into said cup.

3. In combination, a flush tank and flush valve comprising a flush valve adapted to be attached to a water closet, an elongated cylindrical tank supported above said water closet closed at the upper end and attached to said flush valve at the other end, a flexible hose communicating with the downstream side of said flush valve and extending into said tank to the upper end thereof and supported on the lower end only, and a check valve in said hose for preventing the outflow of liquid therethrough but allowing air to flow in.

4. A water closet comprising a bowl, a sealed flush tank a flush valve connecting said tank to said bowl, said tank being elongated vertically and adapted to contain water at its lower part and air at its upper part, a water supply line, pressure regulator means connecting said supply line to said tank whereby the pressure of water in said tank is controlled, said flush valve being constructed to allow substantially all water to drain from said tank each time said tank is flushed and to allow said tank to fill with air at atmospheric pressure each time said tank is flushed, means to close said flush valve immediately after said tank is emptied, and a backflow prevention means in the line of flow from said tank through said flush valve to said closet positively interrupting said line of flow from said tank to said closet when the pressure in said tank falls below a predetermined value.

5. In a water closet, flush tank, and flush valve combination, means to introduce flush water into said water closet, a flow path for flush water from said tank through said flush valve to said closet when said flush valve is activated comprising a tubular body connecting said valve to said closet, a backflow preventer in said tubular body between said valve and said tank, said backflow preventer comprising means positively closing said flow path through said flush valve when the pressure on the upstream side of said backflow preventer drops below a predetermined value.

6. The combination recited in claim 5 wherein said backflow preventer further comprises an opening in the side of said tubular body on the side of said means closing said flow path, and a cup fixed to said tubular body, said opening connecting said cup to the inside of said water closet when the pressure in said tank decreases below a predetermined value.

7. In a water closet, flush tank, and flush valve combination, means to introduce flush water into said water closet, a flow path for flush water from said tank through said flush valve to said closet when said flush valve is activated comprising a tubular body connecting said valve to said closet, a backflow preventer in said tubular body between said valve and said tank, said backflow preventer comprising a two-way vent means normally connecting water to said water closet from said tank and forming a closure between said tank and said water closet when the pressure in said tank falls below atmospheric pressure and connecting air to said tank when said water closet is flushed, said vent means being accessible through the outlet of said tank and supported at a position adjacent thereto only.

8. The combination recited in claim 7 wherein said vent means is removable through said tank outlet.

9. In combination, a water closet, flush tank, and flush valve, a flow path for water from bsaid tank through said flush valve to said closet comprising a hollow body, means to actuate said flush valve, means to hold said flush valve open after actuation, said means to hold said flush valve open comprising means actuated by the velocity head of water flowing from said tank, overflow prevention means in said tank, and a backflow preventer comprising port means in said body connecting the inside of said closet to the atmosphere, and a backflow preventer valve member in said body closing said port means allowing flow from said tank through said port means to said closet and allowing flow from said tank to said closet, said backflow preventer valve preventing the flow from said closet to said tank.

10. A flush valve adapted to be disposed outside a flush tank in a flush tank and water closet combination comprising a hollow body having a passage therethrough, a flushing valve in said body for opening and closing said passage, a port on the side of said body on the downstream side of said flushing valve connecting the inside of said body to the outside thereof, and a backflow preventer comprising a flap valve in said body swingably connected to the inside of said body above said port and normally overlying and forming a closure for said port, said flap valve being mounted to swing away from said port and form a closure in said passage in said body when the pressure on the upstream side of said flap valve is reduced to a predetermined value.

11. A flush valve and backflow combination adapted to be disposed in the channel of flow between a water closet and a flush tank comprising a hollow valve body, a flow passage for water through said hollow valve body, a flush valve means in said body to selectively permit flow of flushing water through said flow passage in said body, a lateral port in one side of said body communicating with said flow passage, and a backflow preventer valve member in said body in said flow passage on the side of said valve means adjacent said closet, said valve member normally closing said lateral port, said backflow preventer valve member being movable to a position away from said lateral port into a position closing said passage through said hollow body when the pressure in said tank is reduced below a predetermined level.

References Cited in the file of this patent

UNITED STATES PATENTS

| | | |
|---|---|---|
| 1,114,398 | Sloan | Oct. 20, 1914 |
| 2,170,321 | Charroin | Aug. 22, 1939 |
| 2,658,203 | Aue | Nov. 10, 1953 |
| 2,714,723 | Griffon | Aug. 9, 1955 |
| 2,957,181 | Lamping | Oct. 25, 1960 |
| 2,979,732 | Harrow | Apr. 8, 1961 |

FOREIGN PATENTS

| | | |
|---|---|---|
| 241,942 | Great Britain | Mar. 24, 1927 |
| 500,690 | Germany | June 24, 1930 |
| 504,808 | Germany | Aug. 8, 1930 |
| 428,335 | Great Britain | May 10, 1935 |
| 849,947 | France | Aug. 28, 1939 |